(12) United States Patent  
Johnson

(10) Patent No.: US 7,135,857 B2
(45) Date of Patent: Nov. 14, 2006

(54) SERIALLY CONNECTED MAGNET AND HALL EFFECT POSITION SENSOR WITH AIR GAPS BETWEEN MAGNETIC POLES

(75) Inventor: Theodis Johnson, Phoenix, AZ (US)

(73) Assignee: Honeywell International, Inc., Morristown, NJ (US)

( * ) Notice: Subject to any disclaimer, the term of this patent is extended or adjusted under 35 U.S.C. 154(b) by 160 days.

(21) Appl. No.: 10/735,041

(22) Filed: Dec. 12, 2003

(65) Prior Publication Data

US 2005/0127901 A1   Jun. 16, 2005

(51) Int. Cl.
G01B 7/30 (2006.01)
G01B 7/14 (2006.01)

(52) U.S. Cl. ............................. 324/207.2; 324/207.25; 324/207.24

(58) Field of Classification Search ........... 324/207.16, 324/310.9, 207.23, 207.25, 207.21, 207.2, 324/207.24; 338/32 H, 32 R; 318/254; 341/11; 400/279
See application file for complete search history.

(56) References Cited

U.S. PATENT DOCUMENTS

| | | | | |
|---|---|---|---|---|
| 3,226,631 A | * | 12/1965 | Friedrich et al. ............ | 323/368 |
| 3,732,381 A | * | 5/1973 | Newell ............................ | 360/8 |
| 3,835,373 A | * | 9/1974 | Matula ...................... | 324/207.2 |
| 4,785,242 A | * | 11/1988 | Vaidya et al. ........... | 324/207.25 |
| 4,944,028 A | * | 7/1990 | Iijima et al. ............ | 324/207.12 |
| 5,093,617 A | * | 3/1992 | Murata ........................ | 324/235 |
| 5,111,092 A | * | 5/1992 | Reinicke ................... | 310/68 B |
| 5,126,663 A | * | 6/1992 | Shinjo ...................... | 324/207.2 |
| 5,196,794 A | * | 3/1993 | Murata ........................ | 324/251 |
| 5,444,370 A | * | 8/1995 | Wu .......................... | 324/207.2 |
| 5,631,093 A | * | 5/1997 | Perry et al. ................... | 428/611 |
| 5,859,531 A | * | 1/1999 | Maurice et al. ........ | 324/207.13 |
| 5,861,747 A | * | 1/1999 | Kubinski ................ | 324/207.21 |
| 5,955,881 A | * | 9/1999 | White et al. ............. | 324/207.2 |
| 5,982,170 A | * | 11/1999 | McCurley et al. ........ | 324/207.2 |
| 6,018,241 A | * | 1/2000 | White et al. ............. | 324/207.2 |
| 6,124,709 A | * | 9/2000 | Allwine ................... | 324/207.2 |
| 6,323,641 B1 | * | 11/2001 | Allwine ................... | 324/207.2 |
| 6,459,261 B1 | * | 10/2002 | Luetzow et al. ....... | 324/207.21 |
| 6,576,890 B1 | * | 6/2003 | Lin et al. ............... | 250/231.14 |
| 6,714,004 B1 | * | 3/2004 | Jagiella ................. | 324/207.16 |
| 2002/0135360 A1 | * | 9/2002 | Matsukawa et al. ... | 324/207.25 |
| 2004/0155648 A1 | * | 8/2004 | Matsuura et al. ........ | 324/207.2 |

FOREIGN PATENT DOCUMENTS

DE   4400616 A1   7/1995

(Continued)

OTHER PUBLICATIONS www.dictionary.reference.com□□ definition of magnet.*

*Primary Examiner*—Jay M. Patidar
(74) *Attorney, Agent, or Firm*—Ingrassia Fisher & Lorenz

(57) ABSTRACT

Methods and apparatus are provided for measuring the position of an object. The apparatus comprises a magnetic sensor assembly having a magnetic field source, sensor and air gap, and a platen containing a region of position varying magnetic properties that moves through the air gap in response to movement of the object, thereby changing the magnetic field measured by the sensor. The measured magnetic field correlates with the object position. For angular position measurements, the region of position varying magnetic properties is desirably a substantially circular stripe whose magnetic thickness and/or magnetic area varies with angular location of the stripe in the air gap and hence the angular position of the object. Multiple air gaps and multiple stripes of varying magnetic properties may be provided to enhance measuring accuracy and convenience.

11 Claims, 9 Drawing Sheets

FOREIGN PATENT DOCUMENTS

| | | | | | | |
|---|---|---|---|---|---|---|
| DE | 10014980 A1 | 4/2001 | GB | 2093295 | * | 8/1982 |
| EP | 0584426 A1 | 3/1994 | JP | 54133367 | * | 10/1979 |

* cited by examiner

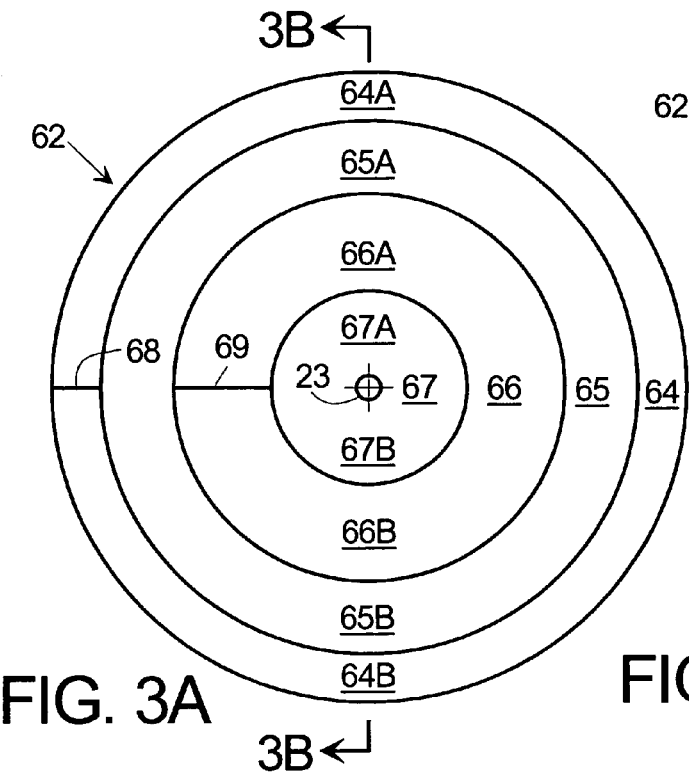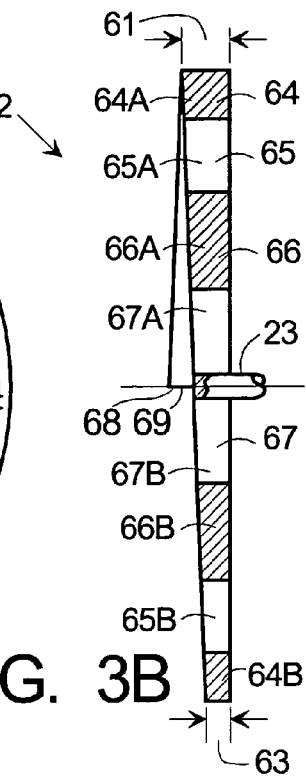
FIG. 3A
FIG. 3B
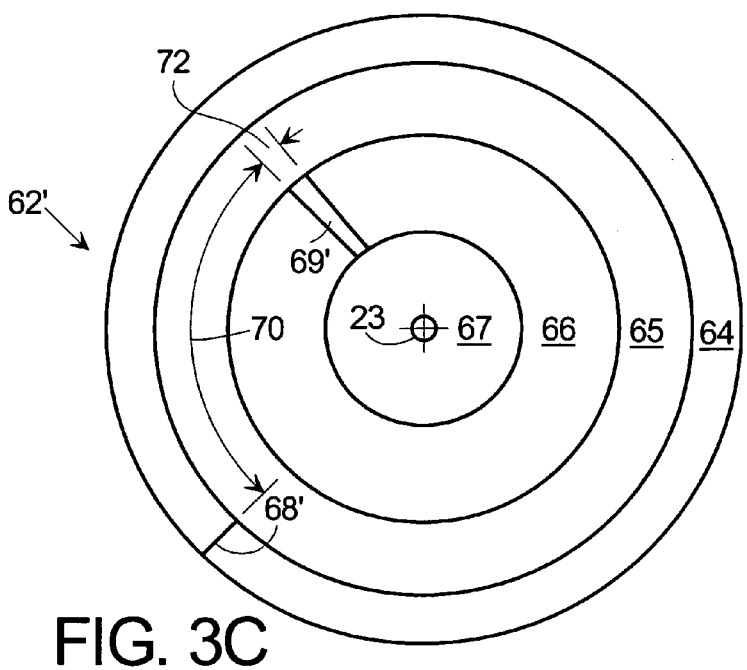
FIG. 3C

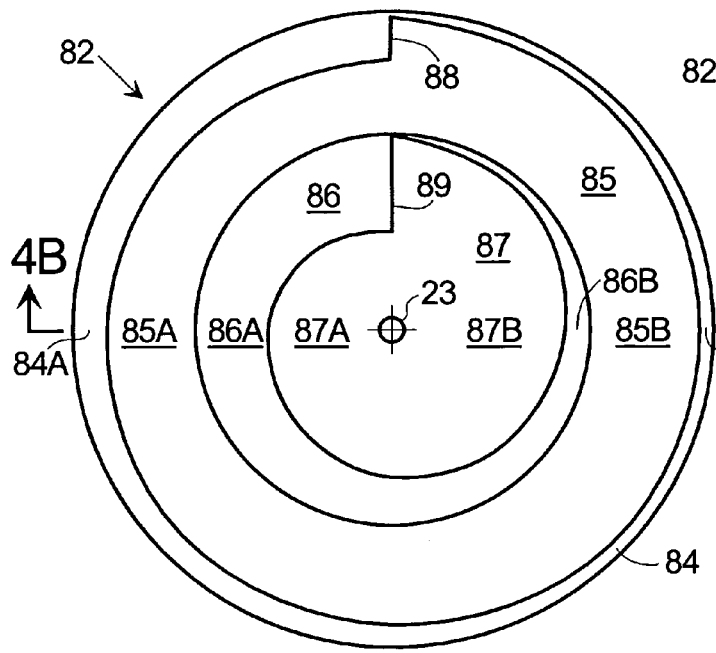
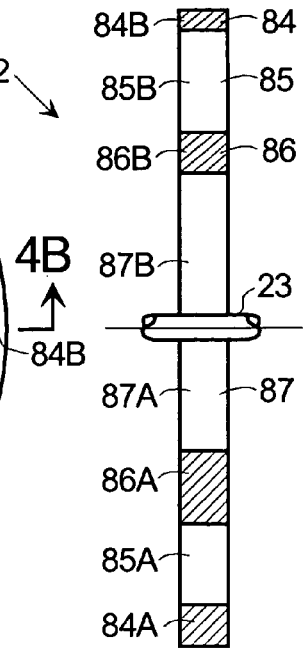
FIG. 4A      FIG. 4B
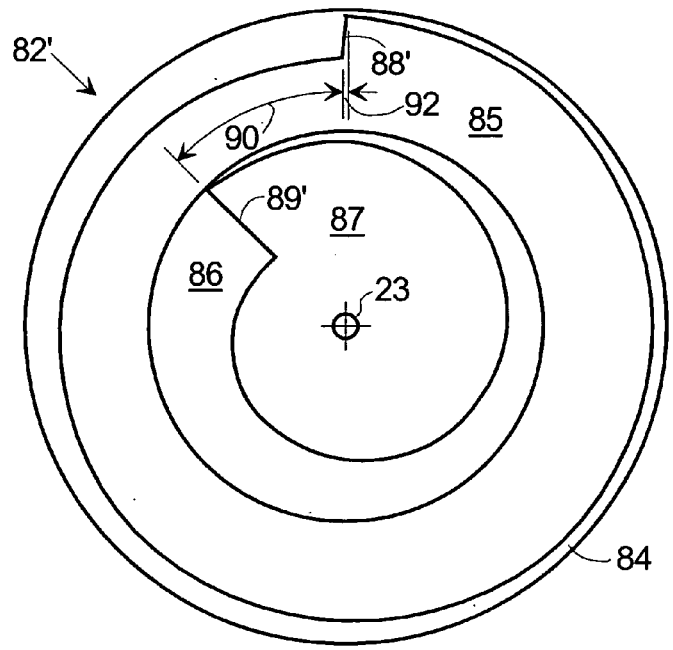
FIG. 4C

SERIALLY CONNECTED MAGNET AND HALL EFFECT POSITION SENSOR WITH AIR GAPS BETWEEN MAGNETIC POLES

TECHNICAL FIELD

The present invention generally relates to position sensing, and more particularly relates to translational and/or rotational position sensing.

BACKGROUND

There are many applications today where it is desired to sense position of a moveable object, for example, the angular orientation of a device or apparatus that rotates about a shaft or pivot, or the position of a device that moves in translation. In the prior art, position has often been measured or detected using optical, magnetic or mechanical resolvers or encoders. For example, an optically detectable pattern is provided around or along the periphery of the device where the pattern varies with the position. This pattern is optically detected and decoded to obtain the rotation angle or translational position. Another prior art approach is to use magnetic rings or moveable magnets to produce a magnetic field that varies with the position or angular rotation of the object to which they are attached. While the optical and moveable magnet approaches have the advantage of being non-contact measuring arrangements they may suffer one or more number of disadvantages, including undesirable complexity and/or inadequate resolution for many applications.

Still further prior art approaches utilize variable potentiometers or capacitors whose wiper arms or plates move with the rotation or translation of the moveable object so that the resistance or capacitance measured across the variable device gives an indication of the position of the object. While the variable potentiometer and capacitor approach are inexpensive, they may suffer from the disadvantage that they may need to be mechanically coupled to the object whose angular orientation or translational location is being measured. A further potential disadvantage of the variable potentiometer approach is that potentiometers may be less reliable as compared to other sensor types. In applications where very high reliability is desired, e.g., space applications, this potentially lower reliability is undesirable. Accordingly there continues to be a need for position measuring devices, such as angle and translation measuring devices, that are reliable, economical, and of adequate resolution.

Accordingly, it is desirable to provide an improved position measuring device and method, especially for measuring the angular position of a shaft or a device rotating about a shaft or pivot, or for measuring the location of a translating device or object, or both. In addition, it is desirable that the sensing apparatus and method be simple, rugged, and reliable and not require any brushes or wiper arms or similar moving mechanical coupling to the device or object whose orientation or position is being sensed. Furthermore, other desirable features and characteristics of the present invention will become apparent from the subsequent detailed description and the appended claims, taken in conjunction with the accompanying drawings and the foregoing technical field and background.

BRIEF SUMMARY

An apparatus is provided for measuring the current position of an object. The apparatus comprises: a magnetic sensor assembly having serially arranged therein, a magnetic field source, a magnetic field sensor and separated poles pieces with a first air gap therebetween; a platen coupled to the object and moving therewith and interacting with the magnetic sensor assembly, the platen containing a first region of position varying magnetic properties that moves through the first air gap in a first direction in response to movement of the object, thereby changing the magnetic reluctance of the first air gap and the magnetic field measured by the sensor, wherein the measured magnetic field indicates the current object position. Multiple air gaps with other moving platen regions of varying magnetic properties may also be used.

A method is provided for measuring the current position of an object using a magnetic sensing apparatus having a magnetic source, sensor and at least one air gap, interacting with a platen attached to the object and at least partly located in the air gap. The method comprises providing a magnetic field in the sensing apparatus using the magnetic source, directing a portion of the magnetic field through the at least one air gap, moving a stripe of material having position varying magnetic properties located on or in the platen, through the at least one air gap in response to movement of the object, measuring the magnetic field for the current location of the platen using the magnetic sensor, and using the measured magnetic field to determine the current object position.

BRIEF DESCRIPTION OF THE DRAWINGS

The present invention will hereinafter be described in conjunction with the following drawing figures, wherein like numerals denote like elements.

FIG. 3A is a simplified plan view and FIG. 3B is a simplified schematic partial cross-sectional view of the disk-shaped platen element illustrated in FIGS. 1A–B, showing further details according to a first embodiment of the present invention;

FIG. 3C is a simplified plan view similar to FIG. 3A but according to an alternative arrangement of the embodiment of FIG. 3A;

FIG. 4A is a simplified plan view and FIG. 4B is a simplified schematic partial cross-sectional view of the disk-shaped element illustrated in FIGS. 1A–B, showing further details according to a further embodiment of the present invention;

FIG. 4C is a simplified plan view similar to FIG. 4A but according to an alternative arrangement of the embodiment of FIG. 4A;

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1A:
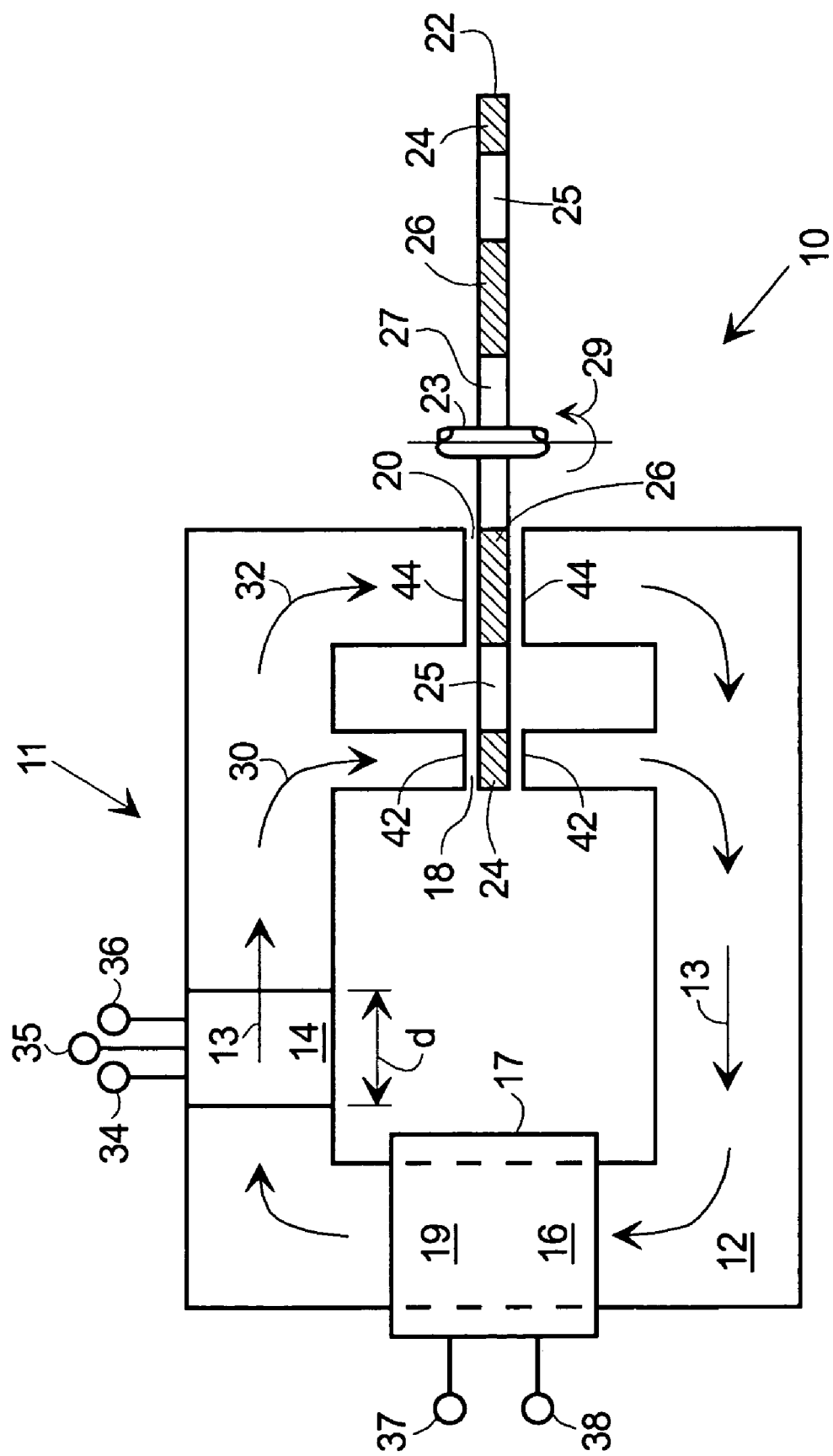
FIG. 1A is a simplified side and partial cross-sectional view of a position sensor according to a first embodiment of the present invention.
Figure 1B:
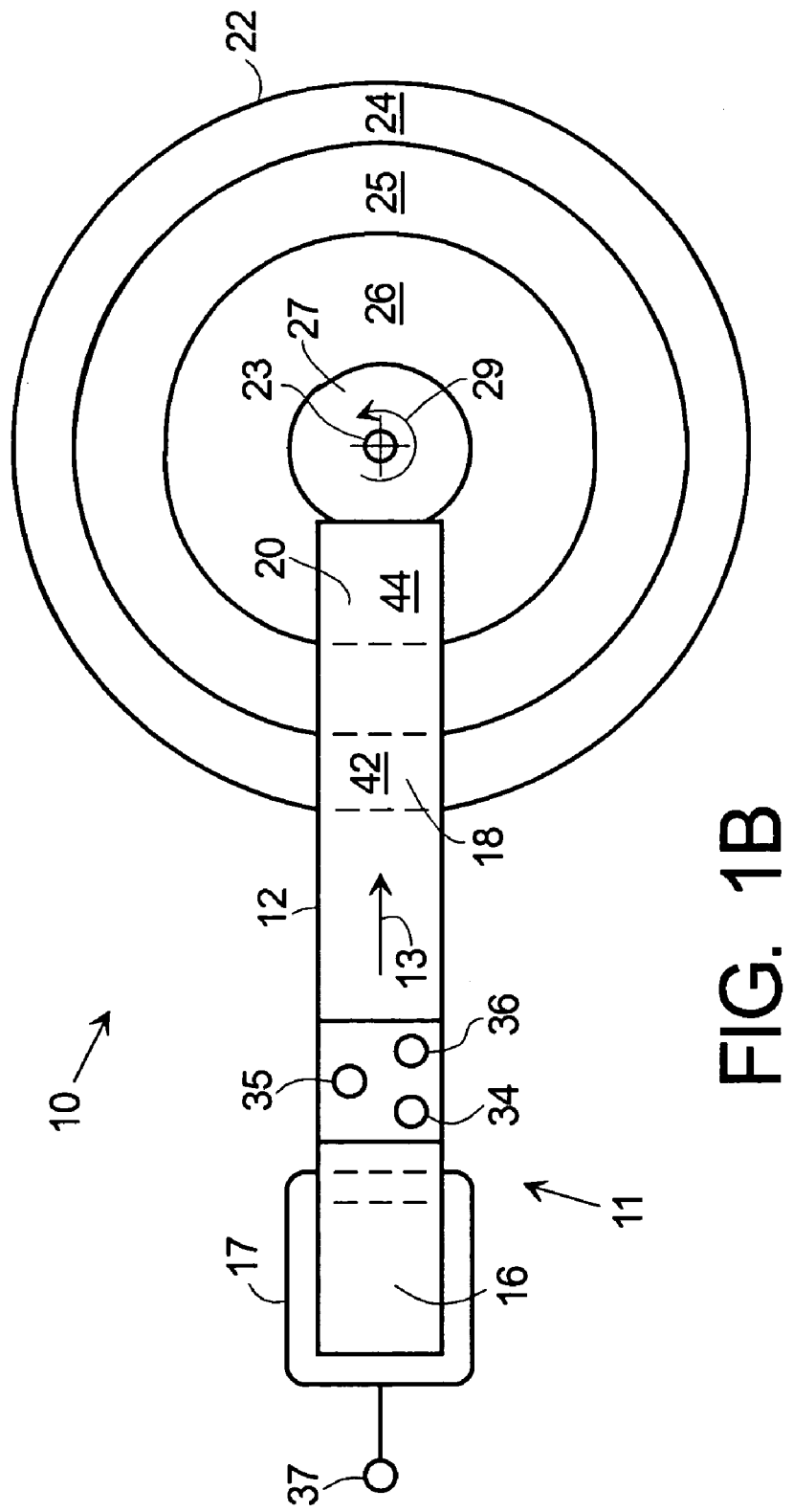
FIG. 1B is a simplified top view of the position sensor of FIG. 1A.

FIG. 1A is a simplified side and partial cross-sectional view of angular position sensor 10 according to a first embodiment of the present invention. FIG. 1B is a simplified top view of sensor 10 of FIG. 1A. Angular position sensor 10 comprises measuring assembly 11 and disk shaped platen 22. Measuring assembly 11 comprises magnetic body 12 for carrying magnetic field or flux 13, magnetic field detector or sensor (MFD) 14 and magnetic field generator (MFG) 16, which are coupled in series in body 12. Iron and iron or ferrite containing alloys are suitable materials for body 12. Body 12 need not be permanently magnetic. Sensor 10 includes at least one air gap (18 or 20) in body 12 of measuring assembly 11. While at least one air gap is essential, two are preferred and more than two can also be utilized. Magnetic field 13 generated by MFG 16 flows through magnetic body 12 and MFD 14 and across air gaps 18, 20 lying between magnetic pole pieces 42–42, 44–44, respectively. Magnetic field 13 provided by MFG 16 can arise from coil 17 carrying a substantially DC current provided via contacts 37, 38 or from permanent magnet 19 magnetically coupled to body 12, or a combination thereof. Either approach is useful. The exact locations of MFD 14 and MFG 16 in body 12 are not critical. What is important is that portions 30, 32 of magnetic field 13 flow across air gaps 18, 20 respectively. The proportion of field 13 flowing across each air gap 18, 20 depends upon the relative magnetic reluctance presented by the air gaps.

Magnetic field detector (MFD) 14 can be a Hall Effect sensor (preferred) or a magneto-resistance sensor or any other type of magnetic field sensor of suitable sensitivity and dynamic range. Persons of skill in the art will understand how to choose appropriate MFG and MFD elements, depending upon their particular application. For convenience of explanation, the present invention is described using a Hall Effect sensor for MFD 14, but this is not intended to be limiting and as used herein, the words "Hall Effect" are intended to include those other physical phenomena that permit measurement of magnetic fields. Contacts 34, 35, 36 are provided for making electrical connection to MFD 14. While three contacts 34, 35, 36 are shown, persons of skill in the art will understand that this is not intended to be limiting and that the number of external contact for MFD 14 will depend upon the type of sensor chosen and the measuring circuit used for detecting the MFD output.

Disk-shaped platen 22, which is seen in partial cross-section in FIG. 1A and in plan view in FIG. 1B, is positioned so that regions 24 and 26 thereof lie in air gaps 18, 20, respectively. In the preferred embodiment, platen 22 has first and second annular magnetic regions 24, 26. Regions 24, 26 are arranged to lie in air gaps 18, 20 between pole pieces 42–42, 44—44 of magnetic body 12. It is not essential that there be two magnetic regions 24, 26 in or on platen 22. One region, e.g., region 24 or region 26 will suffice, but two or more regions are preferred. Disk shaped platen 22 is a part of or mounted on or otherwise coupled to the device (not shown) whose angular position is being measured. For convenience of explanation, measuring platen 22 is shown by arrow 29 as rotating on spindle or pivot 23, but this is not intended to be limiting. With the center of rotation at spindle 23, regions 24, 26 are circular with spindle 23 as their center. The center of rotation of the object and platen 22 may be located elsewhere. All that is important is that rotation causes the portions of platen 22 containing regions 24, 26 to pass between magnetic poles 42, 44 as disk-shaped platen 22 rotates.

As explained more fully in connection with FIGS. 3A–C and FIGS. 4A–C, the magnetic properties of regions 24, 26 vary with angular position around platen 22. Sensor 10 works by detecting the change in magnetic properties that correlate with the angular position of disk 22, and therefore the angular position of the device coupled to disk 22. The presence of the magnetic material of regions 24, 26 in air gaps 18, 20 affects the magnetic reluctance of air gaps 18, 20. The smaller the amount of magnetic material in air gaps 18, 20, the higher the magnetic reluctance and the lower the magnetic field measured by MFD 14, and vice versa. Thus, by use of position varying magnetic regions 24, 26, platen position (and therefore object position) can be correlated with the magnetic field measured by MFD 14. Any arrangement for providing magnetic properties that vary with angle or position on platen 22 may be used. Regions 25, 27 that lie adjacent to magnetic regions 24, 26 are preferably non-magnetic although this is not essential. Because pole pieces 4242, 44—44 of air gaps 18, 20 are limited in extent, the material of platen 22 that lies outside these air gaps will have only a relatively minor effect on the operation of sensor 10. The same applies to equivalent regions between or outside the magnetic tracks illustrated in FIGS. 3–4 and 8–9.

Figure 2:
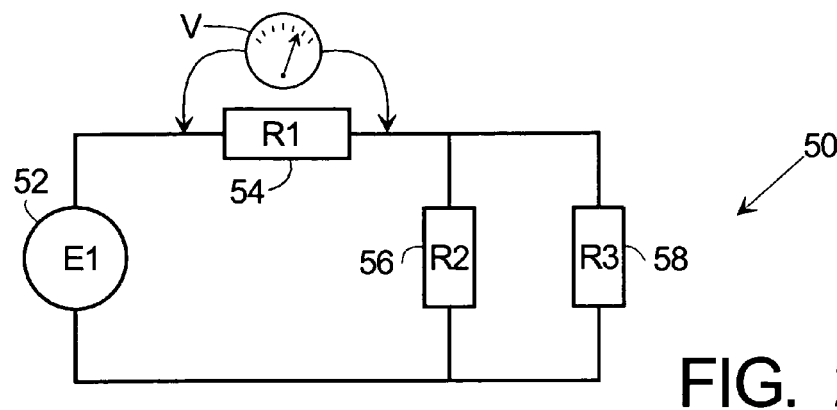
FIG. 2 is a simplified electrical equivalent circuit of the device of FIGS. 1A–B.
Figure 8:
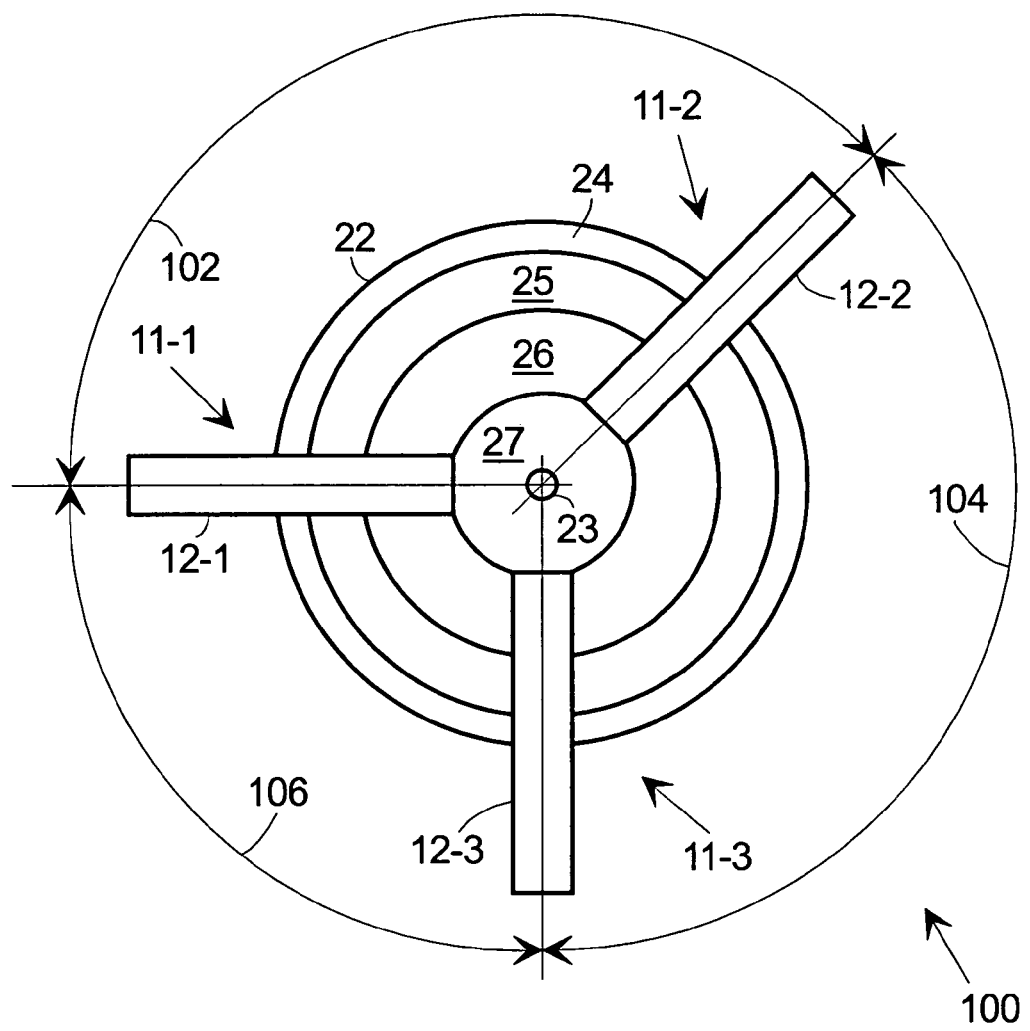
FIG. 8 is a plan view similar to FIG. 1B but of a further embodiment of the present invention utilizing multiple position sensors of the type illustrated in FIGS. 1A–B.
Figure 9A:
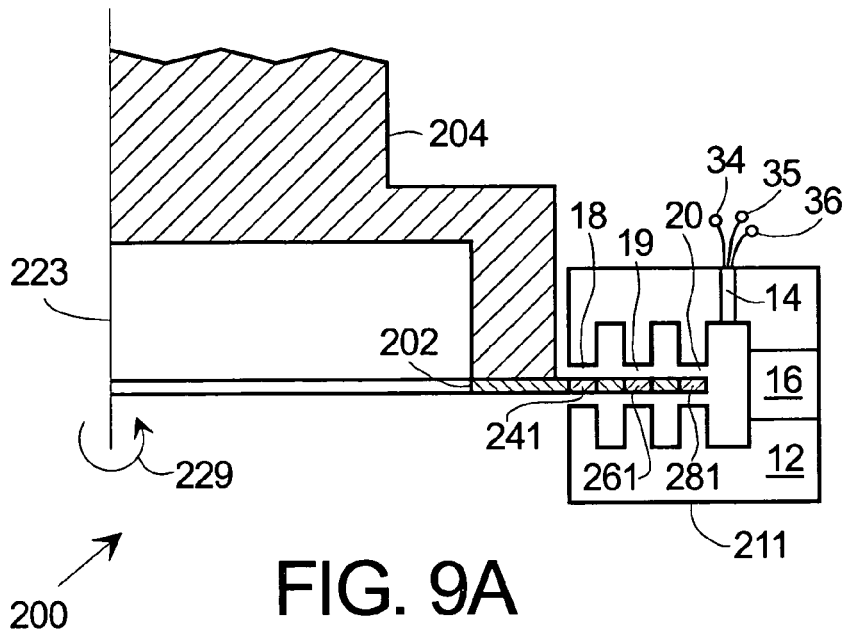
FIG. 9A is a partial cross-sectional side view of a further embodiment of the present invention for measuring angular position using an annular platen disk.
Figure 9B:
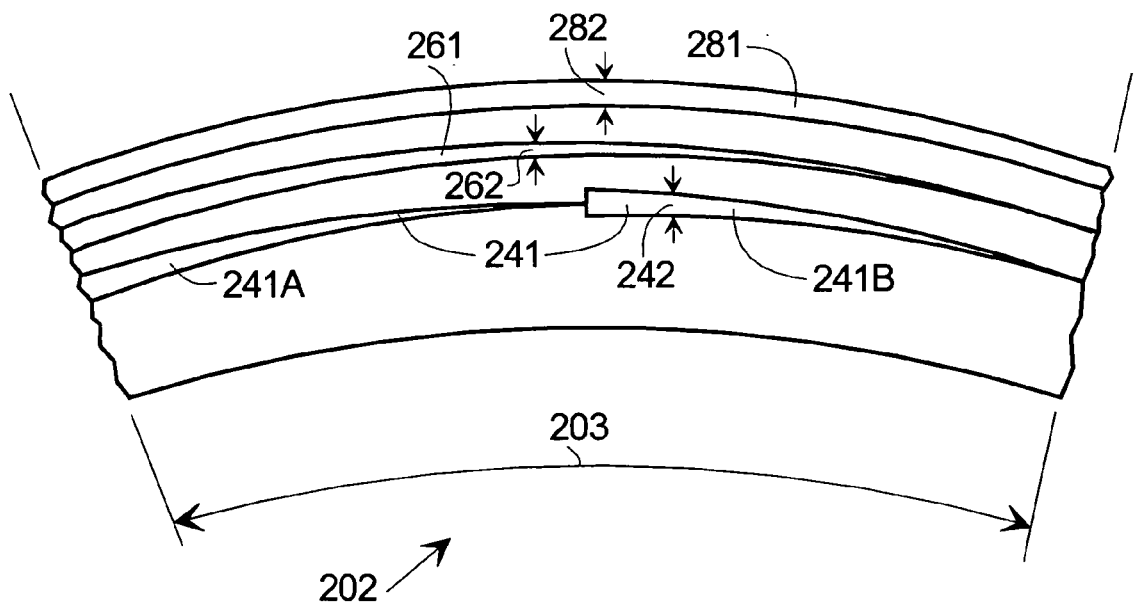
FIG. 9B is a plan view of a portion of the annular platen disk of FIG. 9A.
Figure 9C:
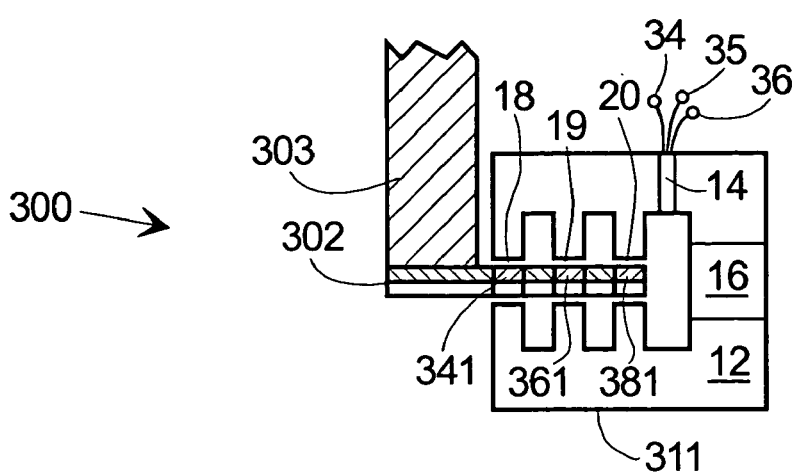
FIG. 9C is a partial cross-sectional side view similar to FIG. 9A but of a still further embodiment of the present invention adapted for measuring translational rather than rotational position.
Figure 9D:
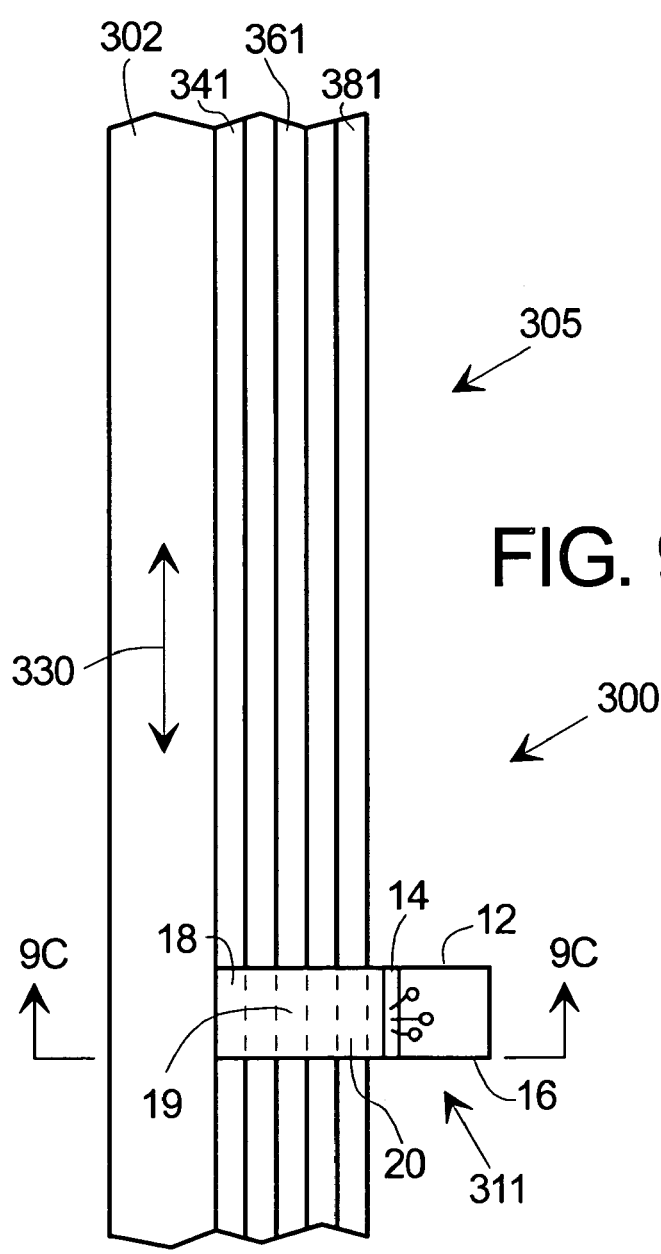
FIG. 9D is a plan view of a portion of the measuring apparatus of FIG. 9C.

FIG. 2 shows simplified electrical equivalent circuit 50 of device 10 of FIGS. 1A–B. Magnetic field generator (MFG) 16 is represented by voltage source 52 (E1). Resistor 54 (R1) represents magnetic field detector or sensor (MFD) 14 and provides a voltage V proportional to the magnetic field in body 12, that is:

$$V = K*B, \quad (1)$$

where B is the magnetic flux density passing through MFD 14 and K is a constant for MFD 14. K will have different values for different types of magnetic field detectors 14. Resistors 56 (R2) and 58 (R3) represent the magnetic reluctance of air gaps 18, 20. As platen 20 moves, different portions of position dependent magnetic regions 24, 26 are located in air gaps 18, 20. This causes the magnetic reluctance of air gaps 18, 20 (and R2 and R3 in circuit 50) to change, which causes magnetic fields 30, 32, 13 to change. The voltage V across R1 (representing MFD 14) provides a measurement of magnetic field strength B within body 12. Because B varies as different portions of regions 24, 26 are present in air gaps 18, 20, the voltage V correlates with the position of platen 22 (and other platens as described later). Thus $$V = K*B = f(\alpha) \text{ or} \quad (2)$$

$$V = K*B = f(x), \quad (3)$$

where α is the rotation angle or angular position of disk or annular-shaped platens 22 of FIGS. 1A–B and equivalent platens 62, 62', 82, 82', 202 of FIGS. 3A–C, 4A–C, 8 and 9A–B, and x is the displacement amount or position in direction 330 of translating platen 302 of FIGS. 9C–D. The variables α and x can be measured from any convenient starting point selected by the user. Thus, the angular or translational position (or both) of a platen and its associated object may be determined by measuring the position dependent magnetic properties of a stripe or other region on the platen.

FIG. 3A is a simplified plan view and FIG. 3B is a simplified schematic partial cross-sectional view of disk-shaped element or platen 62 equivalent to disk-shaped platen 22 of FIGS. 1A–B, showing further details according to a first embodiment of the present invention. FIG. 3C is a view similar to FIG. 3A but according to an alternative arrangement of the embodiment of FIG. 3A. Regions 64, 65, 66, 67 of FIGS. 3A–C correspond to regions 24, 25, 26, 27 of FIGS. 1A–B, respectively, except that magnetic regions 64, 66 are not of uniform thickness. In FIG. 3B, non-magnetic regions 65, 67 are also shown as varying in thickness in about the same manner as magnetic regions 64, 66, but this is merely for convenience of explanation and not essential. Non-magnetic regions 65, 67 can be of uniform thickness or non-uniform thickness, as they have no substantial magnetic effect on the sensor function. Regions 64, 65, 66, 67 of FIGS. 3A–C are of substantially constant radial extent and area but magnetic regions 64, 66 differ in thickness, as a function of angular position around platen 62. For example, portion 64A of magnetic region 64 is of thickness 61 while diametrically opposite portion 64B of region 64 is of thickness 63<61, that is, the thickness of the magnetic regions of disk-shaped platen 62 tapers as a function of angular position on platen 62. The taper may be continuous as shown for example in FIG. 3B or stepped, that is, the thickness of region 64 (and/or region 66 as well) may step down every so many degrees around disk 62. Similarly, region 66 differs in thickness from one portion of the disk to another, that is, region 66A is thicker than counterpart region 66B. While in the preferred embodiment, regions 64, 65, 66, 67 all change in thickness as one progresses circumferentially around disk-shaped platen 62, this is not essential. It is only necessary that at least one of regions 64, 66 has varying magnetic properties (e.g., composition of material, thickness, etc.) as a function of angle as platen 22 passes between corresponding pole pieces 42–42, 44—44 of body 12 of measuring assembly 11.

In FIGS. 3A–B, magnetic regions 64, 66 have transitions 68, 69, respectively, where the thickness of regions 64, 66 change from thin to thick (or vice versa). As disk-shaped platen 22 makes a complete revolution, the thickness of regions 64, 66 varies from maximum thickness on one side of transitions 68, 69 to minimum on the other side of transitions 68, 69, and then for example, jumps back to maximum thickness as transitions 68, 69 are crossed. In FIG. 3A, transitions 68, 69 are illustrated as being abrupt (e.g., represented by radial lines) and at the same angular location around disk 22, but this is not essential. FIG. 3C illustrates another arrangement in which transitions 68', 69' are mutually displaced by angular amount 70 and where, for example, transition 69' is more gradual and has significant angular width 72. Either arrangement is useful and persons of skill in the art will understand based on the description herein how to choose a configuration that best suits their particular needs.

FIG. 4A is a simplified plan view and FIG. 4B is a simplified schematic partial cross-sectional view of disk-shaped platen 82 analogous to platen 22 of FIGS. 1A–B and showing further details according to a further embodiment of the present invention. FIG. 4C is a view similar to FIG. 4A but according to an alternative arrangement of the embodiment of FIG. 4A. Platen 82 has regions 84, 85, 86, 87, analogous to regions 24, 25, 26, 27 of FIGS. 1A–B. Platen 82 has substantially constant thickness, but at least one of regions 84 and 86 varies in radial width (or area) as a function of azimuthal angle around disk-shaped platen 82. For example, portion 84A is radially wider (has a greater area per radian of rotation) than portion 84B and similarly with portions 85A, 86A, 87A versus portions 85B, 86B, 87B. Thus, regions 84, 86 become progressively narrower in radial width (smaller area per radian of rotation) as one progresses circumferentially around disk-shaped platen 82. The area of magnetic material in air gaps 18, 20 decreases as platen 82 rotates. Thus, the magnetic reluctance of the air gap plus platen combination changes with the angular position of platen 82, and magnetic field 13 changes accordingly. The field measured by MFD 14 depends upon the angular position of disk-shaped platen 82 and therefore on the angular position of the device (not shown) to which platen 82 is coupled or of which it is a part.

In FIGS. 4A–B, magnetic regions 84, 86 have transitions 88, 89, respectively, where the radial width per radian of rotation of regions 84, 86 changes from small to large (narrow to wide) or vice versa. As disk-shaped platen 22 makes a complete revolution, the width of regions 64, 66 varies from maximum width on one side of transitions 88, 89 to minimum width on the other side of transitions 88, 89, and then for example, jumps back to maximum width as transitions 88, 89 are crossed. In FIG. 4A, transitions 88, 89 are illustrated as being abrupt (e.g., represented by radial lines) and at the same angular location, but this is not essential. FIG. 4C illustrates another arrangement in which transitions 88', 89' are mutually displaced by angular amount 90 and where, for example, transition 88' has significant angular width 92. Either arrangement is useful and persons of skill in the art will understand based on the description herein how to choose a configuration that best suits their particular needs.

While the arrangement of disk 22 has been illustrated in more detail in connection with the discussion of disks 62, 62', 82, 82' of FIGS. 3A–C (magnetic thickness varies with rotation angle) and 4A–C (magnetic area varies with rotation angle), persons of skill in the art will understand that many variations and combinations are possible for providing tracks or stripes 24, 26 whose magnetic properties vary as one moves circumferentially around platen 22. For example, tracks 24, 26 (or other tracks or stripes) may vary in both thickness and area as a function of angle around disk-shaped platen 22. In a further example, instead of having the magnetic area of regions 24, 26 change by radially tapering regions 24, 26, their radial width may be kept constant and material removed within regions 24, 26 as a function of rotation angle, e.g., by drilling or etching a maze of small holes into or through the magnetic material in regions 24, 26, the number and/or size of such holes varying with circumferential (azimuthal) location in regions 24, 26. Still further, the material composition of regions 24, 26 or the like may vary with angular position on platen 22. A further useful arrangement is to deposit an angularly varying magnetic pattern on platen 22 such that the zones that pass through one or both of air gaps 18, 20 provide unique magnetic signatures that correlate with angular position. Many other variations will occur to those of skill in the art based on the description herein. What is important is that regions 24 and/or 26 have magnetic properties that are different for different angular locations on platen 22.

Figure 7:
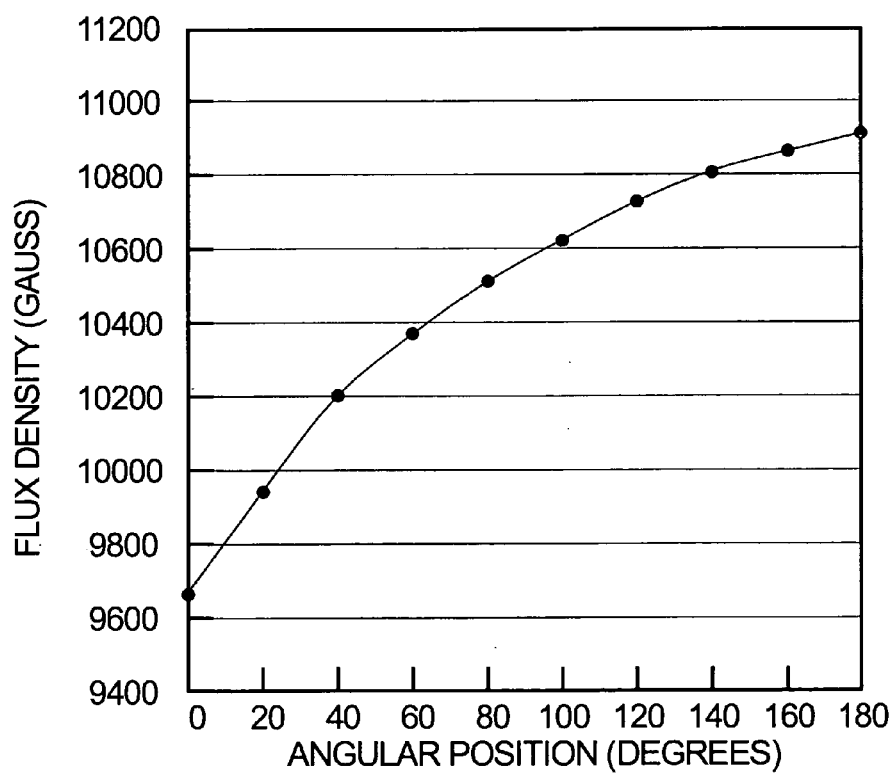
FIGS. 5–7 are graphs illustrating the flux density observed in the position sensor of FIGS. 1A–B as a function of disk rotation angle, according to various embodiments of the present invention.
Figure 6:
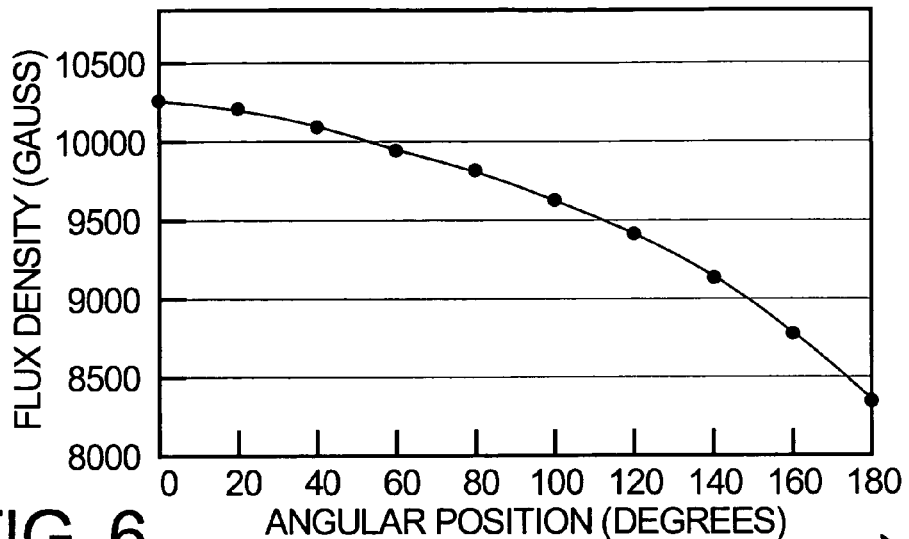
Figure 5:
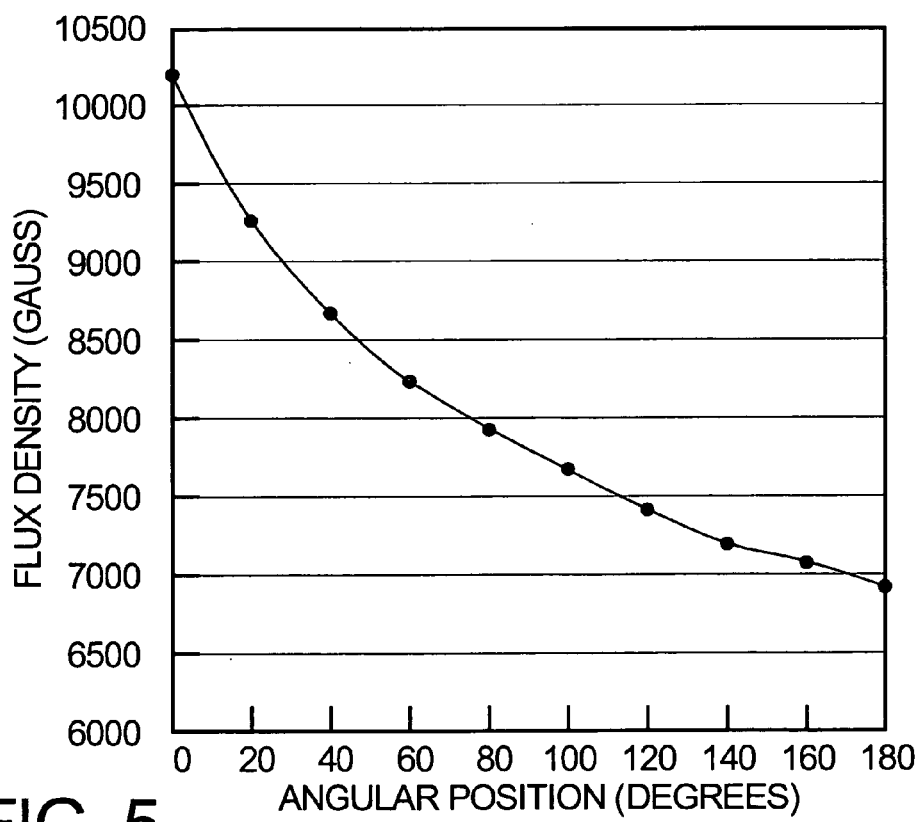

FIGS. 5–7 show graphs 92, 94, 96 illustrating the magnetic field flux density observed in MFD 14 of FIGS. 1A–B or equivalent as a function of disk-shaped platen rotation angle, according to various embodiments of the present invention. FIG. 5 shows the flux density in Gauss versus the angular position of disk-shaped platen 22, 62 for the arrangement shown in FIGS. 3A–B using one of region 64, 66 (analogous to regions 24, 26), where the thickness of regions 64, 66 varied as a function of angular position of platen 62. FIG. 6 shows the flux density in Gauss versus the angular position of disk-shaped platen 22, 82 for the arrangement shown in FIGS. 4A–B using one of region 84, 86 (analogous to regions 24, 26), where the area (radial width) of regions 84, 86 varied as a function of angular position of disk-shaped platen 82. FIG. 7 shows the flux density in Gauss versus the angular position of platen 22, 82 for the arrangement shown in FIGS. 4A–B using both regions 84, 86, where the radial width of regions 84, 86 varied as a function of angular position of disk-shaped platen 22, 82. It is apparent from FIGS. 5–7 that the magnetic field determined by MFD 14 correlates very well with the angular position of disk-shaped platen 22 and thereby provides a reliable angle measuring means and method. Because the magnetic field is contained within body 12 except for short air gaps 18, 20 and because the magnitude of the magnetic field within body 12 is orders of magnitude larger than natural ambient magnetic fields, the apparatus of the present invention is not subject to the interference that is often encountered with prior art angle measuring devices. Similarly, because the device is operating magnetically substantially at DC, the present invention is generally not a source of interference. These are significant advantages.

FIG. 8 is a plan view similar to FIG. 1B but of apparatus 100 according to a further embodiment of the present invention utilizing multiple sensing assemblies 11-1, 11-2, 11-3 each of which is equivalent to sensor assembly 11 of FIGS. 1A–B. Multiple sensor assemblies 11-1, 11-2, 11-3 are disposed around the periphery of disk-shaped platen 22 at various angles 102, 104, 106. This provides redundancy in case of a failure of MFG 16 or MFD 14 or associated circuitry of any of sensor assemblies 11-1, 11-2, 11-3. But the arrangement of apparatus 100 also provides additional features. For example, when one or more of angles 102, 104, 106 separating sensor assemblies 11-1, 11-2, 11-3 is ninety degrees, as illustrated for example with angle 106 separating sensor assemblies 11-1 and 11-3, then, depending upon the direction of rotation of disk-shaped platen 22, the output from sensor assembly 11-1 will be the cosine or sine of the output of angle sensor assembly 11-3 or vice versa. By adjusting angles 102, 104, 106 any desired degree of lead or lag may be obtained in the angular position output signal. This is a significant advantage where such lead or lag signal is needed in connection with the apparatus or device being controlled by means of the angle measurement.

FIG. 9A is a partial cross-sectional side view of apparatus 200 for measuring angular position according to a further embodiment of the present invention. Apparatus 200 comprises annular disk-shaped platen 202 analogous to disk-shaped platen 22 of FIGS. 1A–B. Platen 202 is a part of or is coupled to equipment 204 whose angular position is desired to be measured. Platen 202 and equipment 204 share common axis of rotation 223 about which they both rotate as shown by arrow 229. Apparatus 200 also includes sensing assembly 211, analogous to sensing assembly 11 of FIGS. 1A–B. Sensing assembly 211 of FIG. 9A differs from sensing assembly 11 of FIGS. 1A–B in that assembly 211 utilizes three air gaps 18, 19, 20, but this is merely for purposes of explanation and not intended to be limiting. Any number of air gaps and corresponding magnetic regions on platen 202 can be used. Disk-shaped platen 202 of FIG. 9A has three annular regions 241, 261, 281 that pass through air gaps 18, 19, 20 respectively. As is explained more fully in connection with FIG. 9B, the magnetic properties of region 241, 261, 281 vary with the angular position of disk-shaped platen 202.

FIG. 9B is a plan view of portion 203 of annular platen 202 of FIG. 9A illustrating how the magnetic properties of annular regions 241, 261, 281 on platen 202 vary. Platen 202 utilizes magnetic tracks 241, 261, 281 that vary in area, that is, in radial widths 242, 262, 282 as a function of lateral (azimuthal) angle around disk or washer-shaped platen 202. Outer track 281 has radial width 282 that changes only slowly with circumferential angle around platen 202, for example, changing from minimum to maximum width in substantially 2π radians, i.e., about one complete revolution of disk 202. Width 262 of middle track 261 changes more rapidly as a function of angle, going from maximum to minimum width in less than 2π radians, as for example, in about π radians, i.e., in about a half revolution. Similarly, radial width 242 of inner track 241 goes from maximum to minimum width in a comparatively smaller angular rotation of platen 202. For example, portion 241A and 241B each go from approximately maximum to minimum width within angular sector 203. Use of multiple tracks with different rates of change of magnetic properties per radian of angular rotation provides varying resolution. Track 281 provides a course position measurement, track 261 provides greater precision around the rough position identified using track 281, and track 241 provides still finer resolution within the location identified using tracks 241 and 261. While the arrangement illustrated in FIG. 9A uses single sensor assembly 211 with three air gaps, persons of skill in the art will understand that three separate single air gap sensor assemblies, one for each track 241, 261, 281, can also be used, or a combination thereof. The use of multiple sensor assemblies has the advantage that the signals from the different tracks are more easily separated.

FIG. 9C is a partial cross-sectional side view similar to FIG. 9A but of apparatus 300 according to a still further embodiment of the present invention adapted for measuring translational rather than rotational position, and FIG. 9D is a plan view of portion 305 of the measuring apparatus of FIG. 9C. Apparatus 300 comprises linear strip-shaped platen 302 that serves a function similar to that provided by disk-shaped platen 22 of FIGS. 1A–B, but for translational motion. Strip-shaped platen 302 is a part of or coupled to equipment or object 303 whose translational position is desired to be measured. Apparatus 300 also includes sensing assembly 311, analogous to sensing assembly 11 of FIGS. 1A–B. Sensing assembly 311 of FIG. 9C differs from sensing assembly 11 of FIGS. 1A–B in that assembly 311 utilizes three air gaps 18, 19, 20, but this is merely for purposes of explanation and not intended to be limiting. Any number of air gaps and corresponding magnetic regions in or on platen 302 can be used. Strip-shaped platen 302 of FIGS. 11–12 has three substantially straight regions or stripes 341, 361, 381 that pass through air gaps 18, 19, 20 respectively. As is explained more fully in connection with FIG. 9D, the magnetic properties of regions 341, 361, 381 vary with translational position in the direction of arrow 330 on platen 302. While regions 341, 361, 381 are shown as being substantially straight, this is merely for convenience of explanation and not intended to be limiting. Persons of skill in the art will understand based on the description herein that regions or stripes 341, 361, 381 can be straight or curved depending upon the nature of the motion undertaken by equipment or object 303 and therefore platen 302.

FIG. 9D is a plan view of portion 305 of platen 302 of FIG. 9C illustrating how the magnetic properties of regions 341, 361, 381 on platen 302 vary. By way of example, platen 302 utilizes magnetic tracks or stripes 341, 361, 381 that have constant area, that is, constant width perpendicular to translation direction 330 and vary in magnetic thickness along direction 330, but this is merely for convenience of explanation and not intended to be limiting. Platen 302 could also use the arrangement illustrated in FIG. 9B where the widths of the tracks varies as a function of positions in translation direction 330. Providing varying magnetic thickness as a function of position is explained in connection with FIGS. 3A–C and such explanation is incorporated herein by reference. As sensor assembly 311 and platen 302 move relative to each as shown by directional arrow 330, assembly 311 detects the changes of magnetic properties of magnetic strips or regions 341, 361, 381 passing through air gaps 18, 19, 20, in substantially the same manner as previously explained in connection with FIGS. 1A–9B. MFD 14 measures the magnetic flux flowing in body 12 for each location on strips 341, 361, 381. The measured flux correlates with the properties of regions 341, 361, 381 as a function of position according to Equation (3). Thus the desired positional information is obtained.

In a manner analogous to the arrangement of FIG. 9B, different tracks may have different thickness repeat distances; so as to provide coarse, medium and fine resolutions as has been previously explained. Similarly, three single air gap sensor assemblies, one for each track or region 341, 361, 381 may also be used with the same benefits as described in connection with FIGS. 9–10. While the arrangements illustrated in FIGS. 9A–B and 9C–D have been described as using varying magnetic area and varying magnetic thickness, respectfully, this is merely for convenience of explanation and not intended to be limiting. Persons of skill in the art will understand based n the description herein that any method for varying the magnetic properties of the different magnetic tracks, stripes or regions (e.g., 24, 26, 64, 66, 241, 261, 281, 341, 361, 381) may also be used. Non-limiting examples are: varying the composition of the magnetic material along the tracks (e.g., using a varying mix of magnetic and non-magnetic material as a function of location on the strip), varying the density of the magnetic material by partially removing or adding material as a function of location on an otherwise uniform composition track, depositing a varying magnetic pattern in different regions of the supporting platens, and so forth. Other means of providing varying magnetic properties as a function of location on the magnetic tracks will occur to those of skill in the art based on the description herein and are intended to be included in the claims that follow.

The method of the present invention is now described. A method is provided for measuring the current position of an object using a magnetic sensing apparatus having a magnetic source, magnetic field sensor and at least one air gap. The sensing apparatus interacts with a platen attached to or part of the object. A portion of the platen is located in the air gap. The method comprises: providing a magnetic field in the sensing apparatus using the magnetic source; directing a portion of the magnetic field through the at least one air gap; moving a stripe of material having position varying magnetic properties located on or in the platen, through the at least one air gap in response to movement of the object; measuring the magnetic field for the current location of the platen using the magnetic sensor; and using the measured magnetic field result to determine the current object position. The using step conveniently comprises comparing the measured magnetic field with predetermined data on the relationship between measured magnetic field and platen position to determine the current object location. The providing step conveniently comprises providing a magnetic field using a permanent magnet or providing a magnetic field using an electromagnet or both. The measuring step preferably comprises measuring the magnetic field using a Hall Effect Sensor.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. An apparatus for measuring the current position of an object, comprising:

a magnetic sensor assembly having serially arranged therein, a magnetic field source, a magnetic field sensor, and at least first and second separated pole pieces forming a first air gap and a second air gap, respectively, therebetween, the first air gap located in parallel with the second air gap;

a platen coupled to the object and moving therewith and interacting with the magnetic sensor assembly, the platen containing (i) a first region having magnetic properties that vary monotonically within a predetermined number of radians of rotation of the platen and (ii) a second region of position varying magnetic properties, the platen configured such that the first region and second region move through the first air gap and the second gap, respectively, in a first direction in response to movement of the object, thereby changing the magnetic reluctance of the first air gap and the second air gap, respectively, and the magnetic field measured by the sensor, wherein the measured magnetic field indicates the current object position.

2. The apparatus of claim 1 wherein the position being measured is the angular position of the object and the platen rotates as a function of the angular position of the object, and the first region lies in a principal surface of the platen and is substantially circular in shape so that the position varying magnetic properties of the first region pass sequentially through the air gap as a function of rotation of the object.

3. The apparatus of claim 1 further comprising still further separated pole pieces forming a third air gap therebetween located in parallel with the first and second air gaps, and wherein the platen has a third region of position varying magnetic properties that passes through the third air gap in response to changes in the position of the object.

4. The apparatus of claim 1 wherein at least the first region is formed of a magnetic material whose radial width varies as a function of the angular position of the platen.

5. The apparatus of claim 1 wherein at least the first region is formed of a magnetic material whose Thickness varies as a function of the angular position of the platen.

6. An apparatus for measuring the angular position of an object, comprising:
   a rotatable platen coupled to the object so that rotation of the object causes rotation of the platen;
   a first magnetic sensor assembly having serially arranged therein:
      a first magnetic field source;
      a first magnetic field sensor having a first output;
      first and second magnetic pole pieces forming a first air gap therebetween;
   a first track located on the platen and passing sequentially through the first air gap as the platen rotates, the first track having magnetic properties that vary monotonically within substantially $2\pi$ radians of rotation of the platen;
   a second magnetic sensor assembly having serially arranged therein:
      a second magnetic field source;
      a second magnetic field sensor having a second output;
      third and fourth magnetic pole pieces forming a second air gap therebetween;
   a second track located on the platen and passing sequentially through the second air gap as the platen rotates, the second track having magnetic properties that vary in a second manner as a function of the angular position of the platen; and
   wherein the first output of the first sensor varies as a function of the varying magnetic properties of the first track, thereby providing a measure of the angular position of the platen and the object, and
   wherein the second output of the second sensor varies as a function of the varying magnetic properties of the second track, thereby providing a further measure of the angular position of the platen and the object.

7. The apparatus of claim 6 wherein the first and second magnetic sensor assemblies are spaced apart a predetermined distance around the platen.

8. The apparatus of claim 6 wherein the second track has a portion whose magnetic properties very monotonically over substantially less than $2\pi$ radians of rotation of the platen.

9. The apparatus of claim 6 wherein the first track is formed of a magnetic material whose radial width varies as a function of the angular position of the platen.

10. The apparatus of claim 6 wherein the first track is formed of a magnetic material whose thickness varies as a function of the angular position of the platen.

11. The apparatus of claim 6 wherein the first track is formed of a magnetic material whose magnetic density varies as a function of the angular position of the platen.

* * * * *